US012739846B2

(12) United States Patent
Nimbalker et al.

(10) Patent No.: US 12,739,846 B2
(45) Date of Patent: Sep. 15, 2026

(54) CONTROL CHANNEL HANDLING FOR ENHANCED CROSS-CARRIER SCHEDULING

(71) Applicant: Telefonaktiebolaget LM Ericsson (publ), Stockholm (SE)

(72) Inventors: Ajit Nimbalker, Fremont, CA (US); Ravikiran Nory, San Jose, CA (US); Xingqin Lin, San Jose, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 270 days.

(21) Appl. No.: 18/006,434

(22) PCT Filed: Aug. 6, 2021

(86) PCT No.: PCT/EP2021/072054
§ 371 (c)(1),
(2) Date: Jan. 23, 2023

(87) PCT Pub. No.: WO2022/029312
PCT Pub. Date: Feb. 10, 2022

(65) Prior Publication Data

US 2023/0353321 A1 Nov. 2, 2023

Related U.S. Application Data

(60) Provisional application No. 63/062,987, filed on Aug. 7, 2020.

(51) Int. Cl.
*H04W 72/232* (2023.01)
*H04L 5/00* (2006.01)
*H04W 72/23* (2023.01)

(52) U.S. Cl.
CPC ......... *H04W 72/232* (2023.01); *H04L 5/0044* (2013.01); *H04L 5/0053* (2013.01); *H04W 72/23* (2023.01)

(58) Field of Classification Search
None
See application file for complete search history.

(56) References Cited

U.S. PATENT DOCUMENTS

2012/0207107 A1* 8/2012 Li ......................... H04W 52/58 370/329
2013/0215875 A1 8/2013 Yang et al.
(Continued)

FOREIGN PATENT DOCUMENTS

CN 110475356 A 11/2019
CN 111132359 A 5/2020
(Continued)

OTHER PUBLICATIONS

International Search Report and Written Opinion dated Nov. 24, 2021 for International Application No. PCT/EP2021/072064 filed Aug. 6, 2021, consisting of 13 pages.
(Continued)

*Primary Examiner* — Clemence S Han
(74) *Attorney, Agent, or Firm* — Weisberg I.P. Law, P.A.

(57) ABSTRACT

There is disclosed a network node. The network node is configured to communicate with a wireless device. The wireless device is configured with a primary cell and at least one secondary cell. The network node has a radio interface and a processing circuitry configured to use a physical downlink control channel, PDCCH, on a secondary cell, SCell, to schedule a physical shared channels on a primary cell, PCell and further configured to determine a limit for the PDCCH Blind Decodings and CCEs, BDs/CCEs, for the primary and secondary cells. There is also presented a network node, a method for a wireless device and a wireless device.

19 Claims, 8 Drawing Sheets

(56) References Cited

U.S. PATENT DOCUMENTS

| | | | |
|---|---|---|---|
| 2013/0315135 A1 | 11/2013 | Lee et al. | |
| 2014/0016593 A1 | 1/2014 | Park et al. | |
| 2019/0357238 A1 | 11/2019 | Zhou et al. | |
| 2020/0163114 A1 | 5/2020 | Chen Larsson et al. | |
| 2020/0305134 A1 | 9/2020 | Noh et al. | |
| 2021/0168774 A1* | 6/2021 | Li | H04W 16/14 |
| 2021/0329677 A1 | 10/2021 | Huang | |
| 2021/0352696 A1 | 11/2021 | Yoshimura et al. | |
| 2022/0408465 A1 | 12/2022 | Ji et al. | |
| 2023/0036466 A1* | 2/2023 | Yoshioka | H04L 5/001 |
| 2023/0084554 A1 | 3/2023 | Shi et al. | |
| 2023/0085345 A1 | 3/2023 | Li et al. | |
| 2023/0096674 A1 | 3/2023 | Fu et al. | |
| 2023/0164771 A1 | 5/2023 | Liu et al. | |
| 2023/0254857 A1 | 8/2023 | Moon et al. | |
| 2023/0284205 A1 | 9/2023 | Nory et al. | |

FOREIGN PATENT DOCUMENTS

| | | |
|---|---|---|
| CN | 110830216 B | 3/2021 |
| JP | 20166980 A | 1/2016 |
| JP | 2018522452 A | 8/2018 |
| WO | 2020029945 A1 | 2/2020 |
| WO | 2021130940 A1 | 7/2021 |
| WO | 2021155790 A1 | 8/2021 |
| WO | 2021160011 A1 | 8/2021 |
| WO | 2021172851 A1 | 9/2021 |
| WO | 2021239040 A1 | 12/2021 |
| WO | 2022017386 A1 | 1/2022 |
| WO | 2022029312 A1 | 2/2022 |
| WO | 2022029319 A1 | 2/2022 |

OTHER PUBLICATIONS

International Search Report and Written Opinion dated Nov. 19, 2021 for International Application No. PCT/EP2021/072054 filed Aug. 6, 2021, consisting of 10 pages.

3GPP TSG RAN WG1 Meeting #59 R1-094830; Title: PDCCH Design for Cross-Carrier Operation Using CIF; Source: Motorola; Agenda Item: 7.2.1.1; Document for: Discussion; Location and Date: Jeju, Korea, Nov. 9-13, 2009, consisting of 3 pages.

3GPP TSG RAN WG1 Meeting #86 RP-192967; Title: Summary of Rel-17 email discussion on MR-DC enhancements; Source: Huawei; Agenda Item: 9.1.2; Document for: Discussion and Decision; Location and Date: Sitges, Spain, Dec. 9-12, 2019, consisting of 44 pages.

3GPP TSG-RAN Meeting #86 RP-192677; Title: Summary of Rel-17 email discussion on NR dynamic spectrum sharing; Source: Ericsson (moderator); Agenda Item: 9.1.1; Document for: Discussion and Decision; Location and Date: Sitges, Spain, Dec. 9-12, 2019, consisting of 5 pages.

3GPP TSG RAN Meeting #84 RP-191052; Title: Dynamic spectrum sharing in Rel-17; Source: Ericsson; Agenda Item: 3; Document for: Information; Location and Date: Newport Beach, CA, USA, Jun. 3-6, 2019, consisting of 6 pages.

3GPP TSG-RAN WG1 #102-e R1-2006671; Title: Enhanced cross-carrier scheduling for DSS; Source: Ericsson; Agenda Item: 8.13.1; Document for: Discussion and Decision; Location and Date: eMeeting, Aug. 17-28, 2020, consisting of 6 pages.

3GPP TSG RAN Meeting #86 RP-192797; Title: NR CA enhancements and DSS; Source: Huawei, HiSilicon; Agenda Item: 9.1.1; Document for: Discussion and Decision; Location and Date: Sitges, Spain, Dec. 9-12, 2019, consisting of 2 pages.

3GPP TSG RAN WG2 Meeting #85bis R2-141202; Title: Special SCell functionality in dual connectivity; Source: Intel Corporation; Agenda Item: 7.1.2; Document for: Discussion and Decision; Location and Date: Valencia, Spain, Mar. 31-Apr. 4, 2014, consisting of 3 pages.

3GPP TSG RAN WG1 Meeting #93 R1-1807058; Title: Search space; Source: Ntt Docomo, Inc.; Agenda Item: 7.1.3.1.2; Document for: Discussion and Decision; Location and Date: Busan, South Korea, May 21-25, 2018, consisting of 5 pages.

Taiwan Office Action and English Summary dated Apr. 25, 2022 for Application No. 110129137, consisting of 15 pages.

U.S. Office Action dated Jul. 17, 2025 for U.S. Appl. No. 18/006,624, filed Jan. 24, 2023, consisting of 8 pages.

Japanese Office Action and English Summary dated Mar. 18, 2024 for Application No. 2023507339, consisting of 6 pages.

3GPP TSG RAN Meeting #84; Dynamic spectrum sharing in Rel-17; Agenda Item: 8; Source: Ericsson; Document for: information; Location and Date: Newport Beach, CA, USA, Jun. 3-6, 2019, consisting of 6 pages.

3GPP TS 38.213 V16.2.0; 3rd Generation Partnership Project; Technical Specification Group Radio Access Network; NR; Physical layer procedures for control (Release 16); Jun. 2020, consisting of 176 pages.

3GPP TSG RAN WG1 Meeting #102-e R1-2005440; Title: Discussion on Cross-Carrier Scheduling from SCell to PCell; Source: ZTE; Agenda item: 8.13.1; Document for: Discussion/Decision; Location and Date: e-Meeting, Aug. 17-28, 2020, consisting of 5 pages.

3GPP TS 38.211 V16.6.0 3rd Generation Partnership Project; Technical Specification Group Radio Access Network; NR; Physical channels and modulation (Release 16); Jun. 2021, consisting of 134-pages.

3GPP TSG RAN Meeting #86 RP-193260; Title: New WID on NR Dynamic spectrum sharing (DSS); Source: Ericsson; Agenda item: 9.1.1; Document for: Approval; Location and Date: Sitges, Spain, Dec. 9-12, 2019, consisting of 4 pages.

U.S. Office Action dated Apr. 10, 2025 for U.S. Appl. No. 18/006,624, consisting of 24 pages.

European Communication dated Apr. 17, 2025 for Application No. 21755786.7, consisting of 6 pages.

* cited by examiner

CONTROL CHANNEL HANDLING FOR ENHANCED CROSS-CARRIER SCHEDULING

CROSS-REFERENCE TO RELATED APPLICATIONS

This application is a Submission Under 35 U.S.C. § 371 for U.S. National Stage Patent Application of International Application No.: PCT/EP2021/072054, filed Aug. 6, 2021 entitled "CONTROL CHANNEL HANDLING FOR ENHANCED CROSS-CARRIER SCHEDULING," which claims priority to U.S. Provisional Application No. 63/062,987, filed Aug. 7, 2020, entitled "CONTROL CHANNEL HANDLING FOR ENHANCED CROSS-CARRIER SCHEDULING," the entireties of both of which are incorporated herein by reference.

FIELD

The present disclosure relates to wireless communications, and in particular, to control channel handling for enhanced cross carrier scheduling.

INTRODUCTION

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

Carrier Aggregation (CA) is generally used in NR (5G) and LTE systems to improve WD transmit and receive data rates as compared with systems that do not use CA. With CA, the WD typically operates initially on a single serving cell called a primary cell (or PCell). The PCell is operated on a component carrier in a frequency band. The WD is then configured by the network with one or more secondary serving cells (SCells). Each SCell can correspond to a component carrier (CC) in the same frequency band (intra-band CA) or a different frequency band (inter-band CA) from the frequency band of the CC corresponding to the Pcell. For the WD to transmit and receive data on the SCells (e.g., by receiving downlink shared channel (DL-SCH) information on a physical downlink shared channel (PDSCH) or by transmitting uplink shared channel (UL-SCH) information on a physical uplink shared channel (PUSCH). The SCells need to be activated by the network. The SCells can also be deactivated and later reactivated as needed via activation and deactivation signaling.

For NR carrier aggregation, cross-carrier scheduling (CCS) has been considered using the following framework:

(1) WD has a primary serving cell and can be configured with one or more secondary serving cells (SCells).

(2) For a given SCell with SCell index X:

a) if the SCell is configured with a 'scheduling cell' with cell index Y (i.e., cross-carrier scheduling):

i) SCell X is referred to as the 'scheduled cell';

ii) UE monitors DL PDCCH on the scheduling cell Y for assignments/grants scheduling PDSCH/PUSCH corresponding to Sell X; and/or iii) PDSCH/PUSCH corresponding to SCell X cannot be scheduled for the WD using a serving cell other than scheduling cell Y.

b) Otherwise:

i) SCell X is the scheduling cell for SCell X (i.e., same-carrier scheduling);

ii) UE monitors DL PDCCH on SCell X for assignments/grants scheduling PDSCH/PUSCH corresponding to SCell X; and/or iii) PDSCH/PUSCH corresponding to SCell X cannot be scheduled for the WD using a serving cell other than SCell X.

(3) An SCell cannot be configured as a scheduling cell for the primary cell. The primary cell is always its own scheduling cell.

With current CA and cross-carrier scheduling framework, a SCell cannot be used for scheduling physical shared data channels such as PDSCH/PUSCH on the PCell. Adding additional scheduling cells for the PCell will require enhancements to physical downlink control channel, PDCCH, blind decoding/control channel element, BD/CCE, handling framework to enable this functionality.

SUMMARY

Some embodiments advantageously provide methods and nodes for control channel handling for enhanced cross carrier scheduling.

Solutions enable an SCell to be used as second "scheduling cell" for scheduling PDSCH/PUSCH on the primary cell without any increase in WD's overall BD/CCE budget (and complexity) while improving system performance via flexible BD/CCE allocation for the two cells scheduling the primary cell.

In one embodiment a network node is provided. The network node is configured to communicate with a wireless device. The wireless device is configured with a primary cell and at least one secondary cell. The network node comprising a radio interface and a processing circuitry configured to use a physical downlink control channel, PDCCH, on a secondary cell, SCell, to schedule a physical shared channels on a primary cell, PCell and further configured to determine a limit for the PDCCH Blind Decodings and CCEs, BDs/CCEs, for the primary and secondary cells.

In one embodiment a method is provided. The method is implemented in a network node configured to communicate with a wireless device, the wireless device configured with a primary cell and at least one secondary cell. The method includes using a physical downlink control channel, PDCCH, on a secondary cell, SCell, to schedule a physical shared channels on a primary cell, PCell. The method further includes determining a limit for the PDCCH Blind Decodings and CCEs, BDs/CCEs, for the primary and secondary cells.

In one embodiment a wireless device is provided. The wireless device configured with a primary cell and at least one secondary cell. The wireless device configured to communicate with a network node and comprising a radio interface and a processing circuitry configured to receive a physical downlink control channel, PDCCH, on a secondary cell, SCell, to schedule physical shared channels on a primary cell, PCell, where there is a limit for the PDCCH Blind Decodings and CCEs, BDs/CCEs, for the primary and secondary cells.

In one embodiment there is provided a method. The method is implemented in a wireless device configured with a primary cell and at least one secondary cell, the wireless device configured to communicate with a network node. The method includes receiving a physical downlink control channel, PDCCH, on a secondary cell, SCell, to schedule physical shared channels on a primary cell, PCell, where there is a limit for the PDCCH Blind Decodings and CCEs, BDs/CCEs, for the primary and secondary cells.

A PCell can normally only be scheduled by the PCell. The embodiments enable an SCell to be used for scheduling PDSCH/PUSCH on the PCell without any increasing the wireless device's BD/CCE budget. Adding one or more scheduling cells for the PCell, the SCell in this case could otherwise necessitate an increase in the BDs/CCEs budget. An increase in the BDs/CCEs budget would then require more wireless device processing and computational power and could also require increased wireless device complexity.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
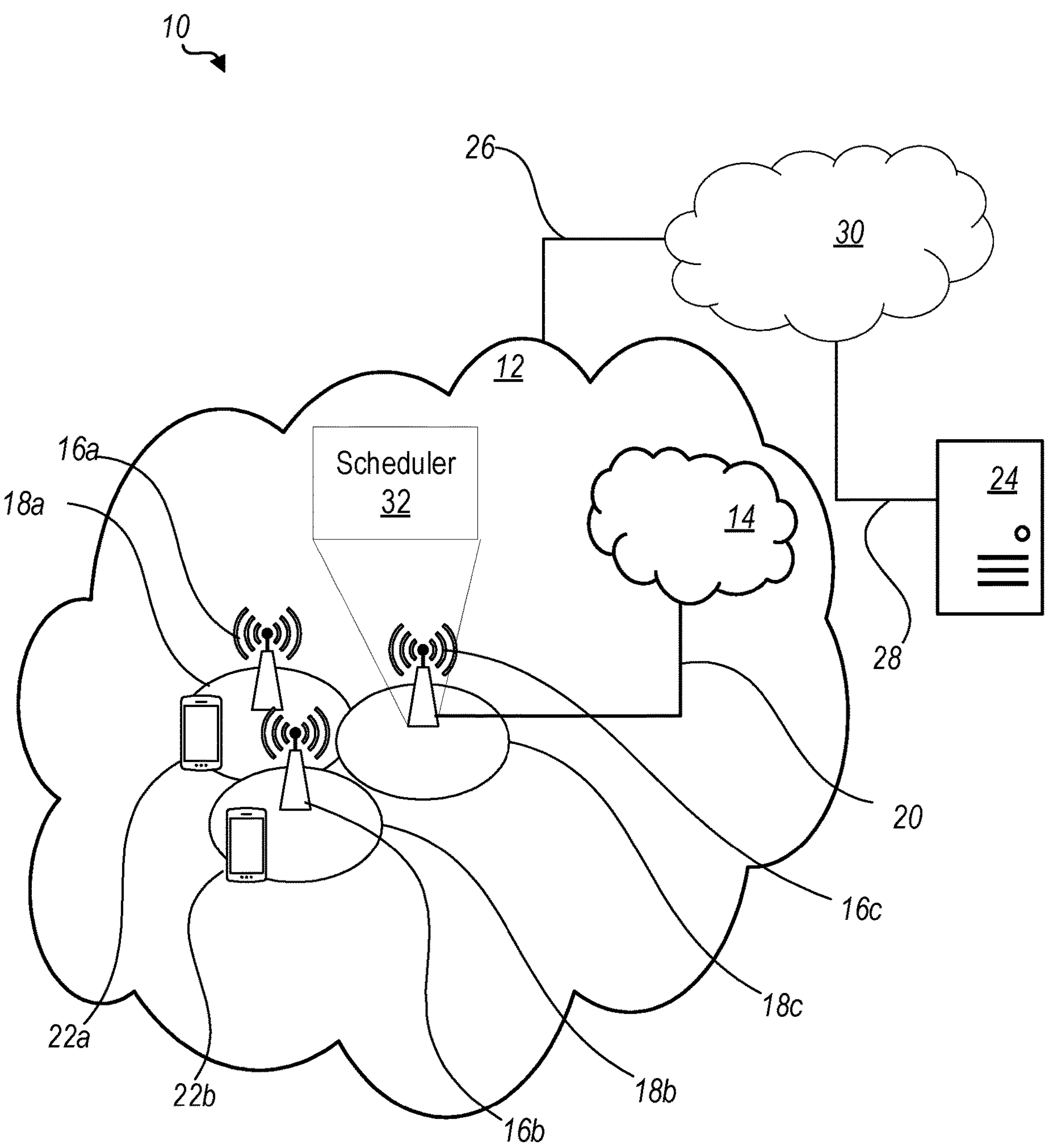
FIG. 1 is a schematic diagram of an example network architecture illustrating a communication system connected via an intermediate network to a host computer according to the principles in the present disclosure.

Before describing in detail example embodiments, it is noted that the embodiments reside primarily in combinations of apparatus components and processing steps related to control channel handling for enhanced cross carrier scheduling. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Solutions enable an SCell to be used as a second "scheduling cell" for scheduling PDSCH/PUSCH on the primary cell without any increase in the WD's overall BD/CCE budget (and complexity) while improving system performance via flexible BD/CCE allocation for the two cells scheduling the primary cell.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a scheduler 32 which is configured to schedule primary downlink and uplink shared channels using a SCell.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include the scheduler 32 which is configured to schedule primary downlink and uplink shared channels using a SCell.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Dual Connectivity (DC) is generally used in NR (5G) and LTE systems to improve WD transmit and receive data rates over systems which do not use DC. With DC, the WD typically operates with a master cell group (MCG) and a secondary cell group (SCG). Each cell group can have one or more serving cells. The MCG cell, operating on the primary frequency, in which the WD either performs the initial connection establishment procedure or initiates the connection re-establishment procedure, is referred to as the primary cell or PCell. The SCG cell in which the WD performs random access when performing the Reconfiguration with Sync procedure is referred to as the primary SCG cell or PSCell.

In some cases, the term "primary cell" or "primary serving cell" can refer to PCell for a WD not configured with DC, and can refer to PCell of MCG or PSCell of SCG for a WD configured with DC.

In 3GPP NR standards, downlink control information (DCI) is received over the physical layer downlink control channel (PDCCH). The PDCCH may carry DCI in messages with different formats. DCI format 0_0, 0_1, and 0_2 are DCI messages used to convey uplink grants to the WD for transmission of the physical layer data channel in the uplink (PUSCH) and DCI format 1_0, 1_1, and 1_2 are used to convey downlink grants for transmission of the physical layer data channel in the downlink (PDSCH). Other DCI formats (e.g., DCI 2_0, 2_1, 2_2 and 2_3) are used for other purposes such as transmission of slot format information, reserved resource, transmit power control information, etc.

A PDCCH candidate is searched within a common or WD-specific search space which is mapped to a set of time and frequency resources referred to as a control resource set (CORESET). The search spaces within which PDCCH candidates must be monitored are configured to the WD via radio resource control (RRC) signaling. A monitoring periodicity is also configured for different PDCCH candidates. In any particular slot, the WD may be configured to monitor multiple PDCCH candidates in multiple search spaces which may be mapped to one or more CORESETs. PDCCH candidates may need to be monitored multiple times in a slot, once every slot or once in multiple of slots.

The smallest unit used for defining CORESETs is a Resource Element Group (REG) which is defined as spanning 1 PRB×1 OFDM symbol in frequency and time. Each REG contains demodulation reference signals (DM-RS) to aid in the estimation of the radio channel over which that REG was transmitted. When transmitting the PDCCH, a precoder could be used to apply weights at the transmit antennas based on some knowledge of the radio channel prior to transmission. It is possible to improve channel estimation performance at the WD by estimating the channel over multiple REGs that are proximate in time and frequency if the precoder used at the transmitter for the REGs is not different. To assist the WD with channel estimation, the multiple REGs can be grouped together to form a REG bundle and the REG bundle size for a CORESET is indicated to the WD. The WD may assume that any precoder used for the transmission of the PDCCH is the same for all the REGs in the REG bundle. A REG bundle may consist of 2, 3 or 6 REGs.

A control channel element (CCE) consists of 6 REGs. The REGs within a CCE may either be contiguous or distributed in frequency. When the REGs are distributed in frequency, the CORESET is said to be using an interleaved mapping of REGs to a CCE and if the REGs are not distributed in frequency, a non-interleaved mapping is said to be used.

A PDCCH candidate may span 1, 2, 4, 8 or 16 CCEs. The number of aggregated CCEs used is referred to as the aggregation level for the PDCCH candidate.

A hashing function is used to determine the CCEs corresponding to PDCCH candidates that a WD must monitor within a search space set. The hashing can be done differently for different WDs so that the CCEs used by the WDs are randomized and the probability of collisions between multiple WDs for which PDCCH messages are included in a CORESET is reduced.

Blind decoding of potential PDCCH transmissions is attempted by the WD in each of the configured PDCCH candidates within a slot. The complexity incurred at the WD to do this depends on number of blind decoding attempts and the number of CCEs which need to be processed.

In order to manage complexity, limits on the total number of CCEs and/or total number of blind decodes to be processed by the WD have been discussed and a possible technique for blind decoding/control channel element (BD/CCE) partitioning based on WD capability has been adopted for NR operation with multiple component carriers.

In current NR, a scheduled cell has only one scheduling cell. A primary cell is always a scheduling cell. A scheduling cell carries DCI scheduling itself and can carry DCI scheduling other cells. When a WD is configured with cross-carrier scheduling, the PDCCH carrying the DCI format for scheduling the PDSCH/PUSCH on the scheduled cell is sent on a scheduling cell. In such a case, a carrier indicator field is included in the DCI formats (e.g., non-fallback DCI formats such as 0-1/1-1 for scheduling PUSCH/PDSCH) on the scheduling cell. Higher layer configuration indicates the linkages between the scheduled/scheduling cells, the CIF value to monitor, and the corresponding search space configuration for monitoring DCI formats of a scheduled cell on the scheduling cell, etc.

A WD can be configured with up to three CORESETs and up to ten search spaces for each DL BWP in a scheduling cell. NW can configure the search spaces that a WD monitors according to some constraints or limits on maximum number of blind decodes and control channel elements.

For a single serving cell case:

the maximum number of monitored PDCCH candidates per slot of a DL BWP is given by 44, 36, 22, 20 for SCS 15, 30, 60 and 120 kHz, respectively;

the maximum number of non-overlapped CCEs per slot of a DL BWP is given by 56, 56, 48, 32 for SCS 15, 30, 60 and 120 kHz, respectively.

For a CA case with up to a first number (e.g. four) of aggregated carriers, for each scheduled cell:

the maximum number of monitored PDCCH candidates per slot of a DL BWP of a scheduling cell is given by 44, 36, 22, 20 for scheduling cell SCS 15, 30, 60 and 120 kHz respectively;

the maximum number of non-overlapped CCEs per slot of a DL BWP of a scheduling cell is given by 56, 56, 48, 32 for scheduling cell SCS 15, 30, 60 and 120 kHz, respectively. For CA case with more than a first number (e.g. four) of aggregated carriers, for each scheduled cell: the maximum number of monitored PDCCH candidates per slot of a DL BWP of a scheduling cell; and the maximum number of non-overlapped CCEs per slot of a DL BWP of a scheduling cell;

is given by a proportional split which can be based on 1) a CA BD/CCE parameter (e.g. reported by the WD for CA case or configured by NW based on the reported capability by the WD for NR-DC case), 2) number of cells configured for the WD, and 3) number of carriers with corresponding numerology.

If the number of aggregated carriers is larger than the CA BD/CCE parameter (denoted by $$N_{cells}^{cap}$$

), then the BDs are proportionally split. Otherwise, the single serving cell limits apply for each carrier. The proportional split is as described below.

If a WD is configured with $$N_{cells}^{DL,\mu}$$

downlink cells with DL BWPs having SCS configuration μ, where $$\sum_{\mu=0}^{3} N_{cells}^{DL,\mu} > N_{cells}^{cap},$$

a DL BWP of an activated cell is the active DL BWP of the activated cell, and a DL BWP of a deactivated cell is the DL BWP with index provided by firstActiveDownlinkBWP-Id for the deactivated cell, the WD is not required to monitor more than $$M_{PDCCH}^{total,\,slot,\mu} = \left\lfloor N_{cells}^{cap} \cdot M_{PDCCH}^{max,slot,\mu} \cdot N_{cells}^{DL,\mu} \Big/ \sum_{j=0}^{3} N_{cells}^{DL,j} \right\rfloor$$

PDCCH candidates or more than $$C_{PDCCH}^{total,slot,\mu} = \left\lfloor N_{cells}^{cap} \cdot C_{PDCCH}^{max,slot,\mu} \cdot N_{cells}^{DL,\mu} \Big/ \sum_{j=0}^{3} N_{cells}^{DL,j} \right\rfloor$$

non-overlapped CCEs per slot on the active DL BWP(s) of scheduling cell(s) from the $$N_{cells}^{DL,\mu}$$

downlink cells. Here $$N_{cells}^{cap}$$

is CA BD/CCE parameter (e.g. reported by the WD for CA case or configured by NW for MCG and for SCG based on the reported capability by the WD for NR-DC case), $$C_{PDCCH}^{max,slot,\mu} \text{ and } M_{PDCCH}^{max,slot,\mu}$$

are the maximum number of non-overlapped CCEs per slot of a DL BWP and the maximum number of monitored PDCCH candidates per slot of a DL BWP for single cell case with SCS μ (μ=x corresponds to SCS of $15*2^x$ Hz), respectively. The NW can configure BD/CCEs for the WD satisfying the above constraints.

Consider the following example:

Example 1: WD is configured with a primary cell with 15 kHz numerology and four SCells with 30 kHz numerology (each is self-scheduled), and the WD indicates a pdcch-BlindDetectionCA capability of $$N_{cells}^{cap} = 4.$$

Then for the 15 kHz(μ=0), $$M_{PDCCH}^{total,slot,\mu} = \lfloor 4 \times 44 \times 1/5 \rfloor = 35,$$

$$C_{PDCCH}^{total,slot,\mu} = \lfloor 4 \times 56 \times 1/5 \rfloor = 44$$

and for the 30 kHz (μ=1), $$M_{PDCCH}^{total,slot,\mu} = \lfloor 4 \times 36 \times 4/5 \rfloor = 115,\ C_{PDCCH}^{total,slot,\mu} = \lfloor 4 \times 56 \times 4/5 \rfloor = 179.$$

Thus, for the 15 kHz primary cell, the WD can be configured with up to 35 BDs with maximum of 44 non-overlapped CCEs per slot. For the 30 kHz serving cells, the WD can be configured with an aggregate (across all four SCells) of maximum of 115 BDs and maximum of 179 non-overlapped CCEs per slot, and with a per-carrier limit of 36 BDs and 56 CCEs per slot of a carrier. An example BD/CCE allocation for the different cells is shown below.

| | Primary cell | SCell1 | SCell2 | SCell3 | SCell4 |
|---|---|---|---|---|---|
| Limit on BDs/CCEs | 35/44 per 1 ms | | 115/179 per 0.5 ms | | |
| BDs | 35 | 28 | 28 | 28 | 29 |
| CCEs | 44 | 44 | 44 | 44 | 45 |

In cases of cross-carrier scheduling, for a scheduled cell, the BDs/CCEs limits are determined based on the numerology of the scheduling cell and are applied per slot of the scheduling cell.

Figure 2:
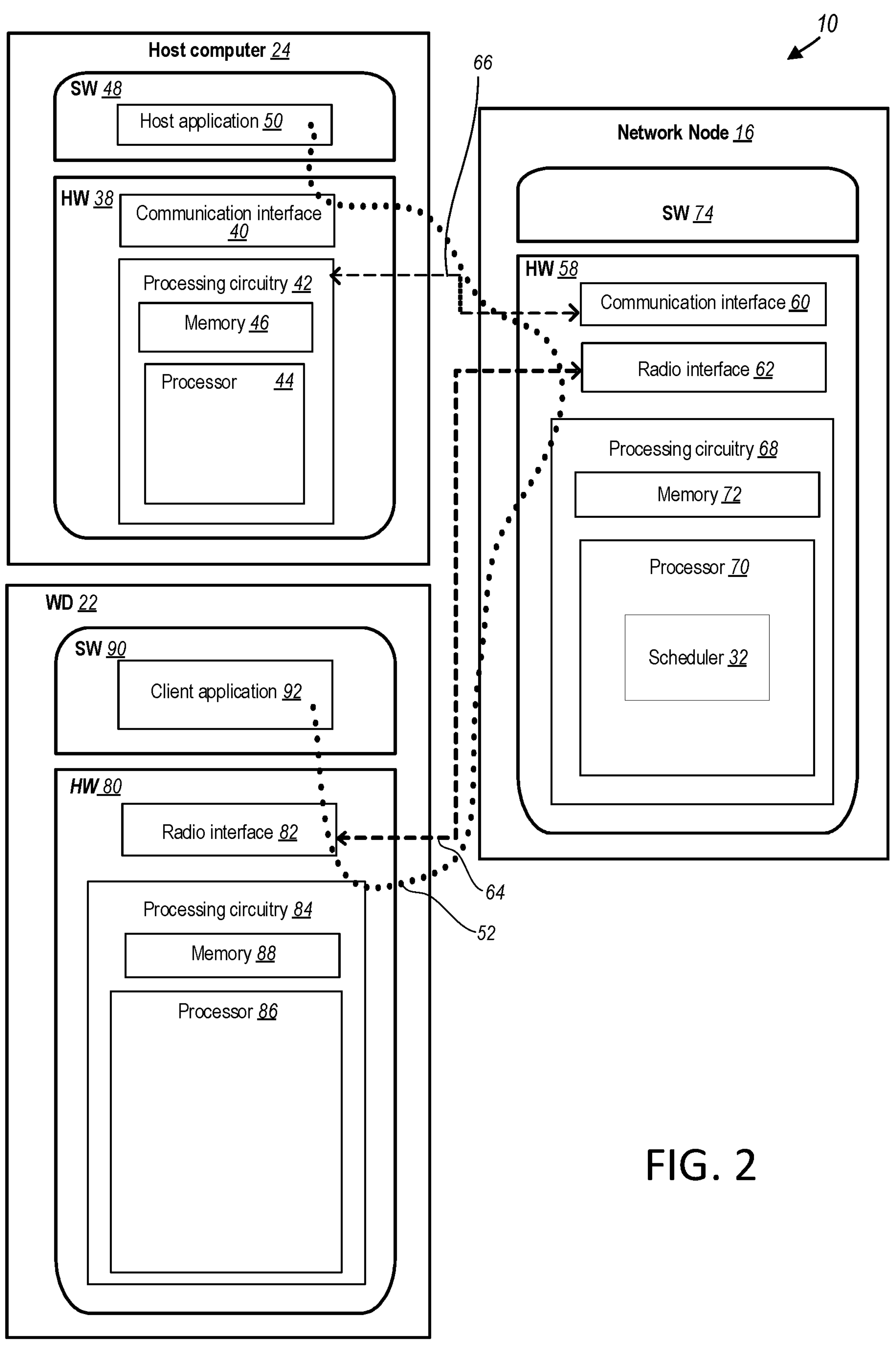
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as scheduler 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
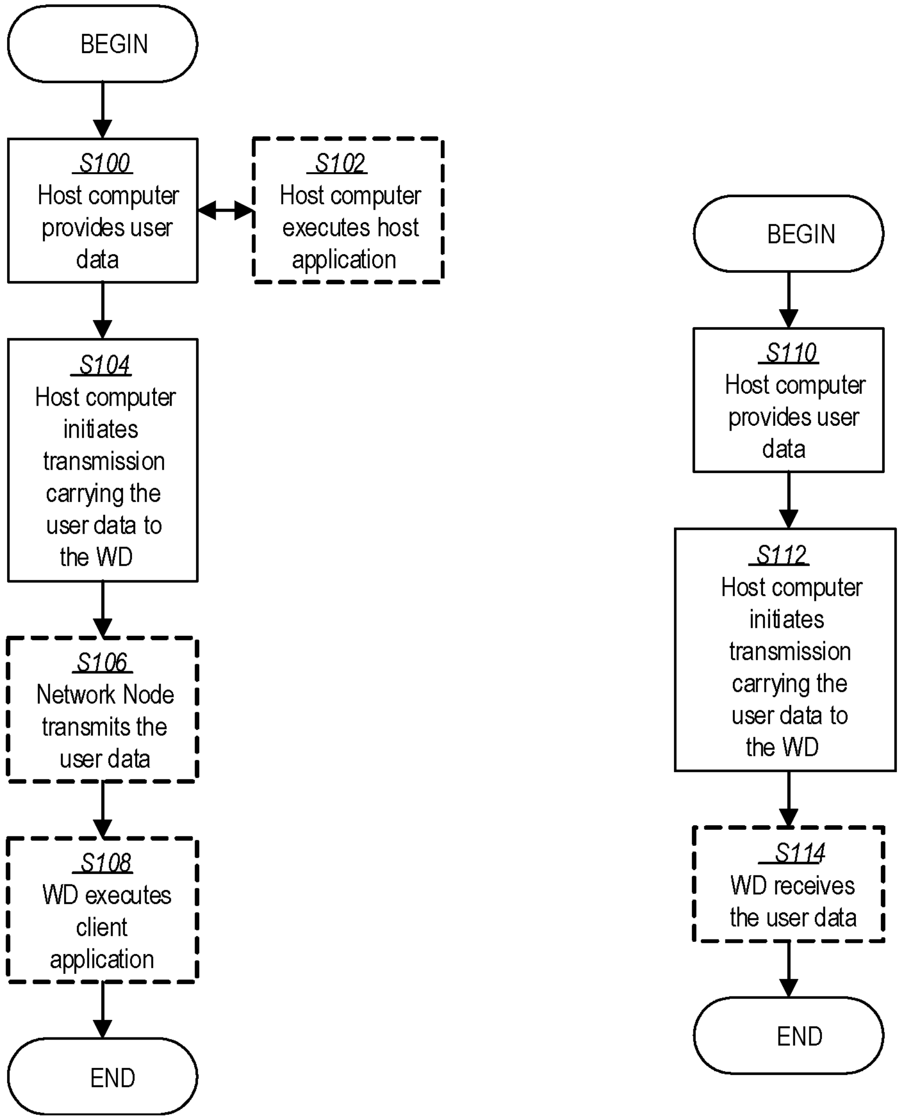
FIG. 3 is a flowchart illustrating example methods implemented in a communication system including a host computer, a network node and a wireless device for executing a client application at a wireless device according to some embodiments of the present disclosure.
FIG. 4 is a flowchart illustrating example methods implemented in a communication system including a host computer, a network node and a wireless device for receiving user data at a wireless device according to some embodiments of the present disclosure.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 5, 6:
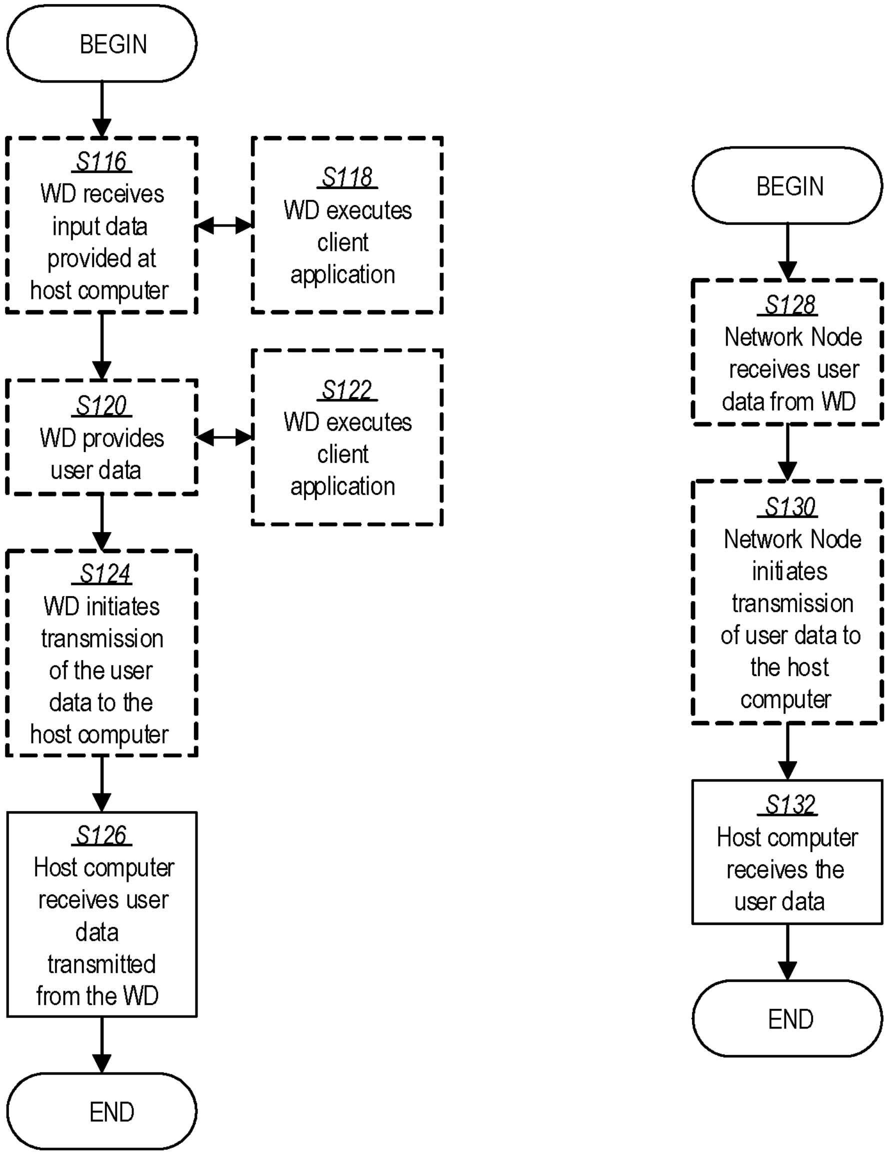
FIG. 5 is a flowchart illustrating example methods implemented in a communication system including a host computer, a network node and a wireless device for receiving user data from the wireless device at a host computer according to some embodiments of the present disclosure.
FIG. 6 is a flowchart illustrating example methods implemented in a communication system including a host computer, a network node and a wireless device for receiving user data at a host computer according to some embodiments of the present disclosure.

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7A:
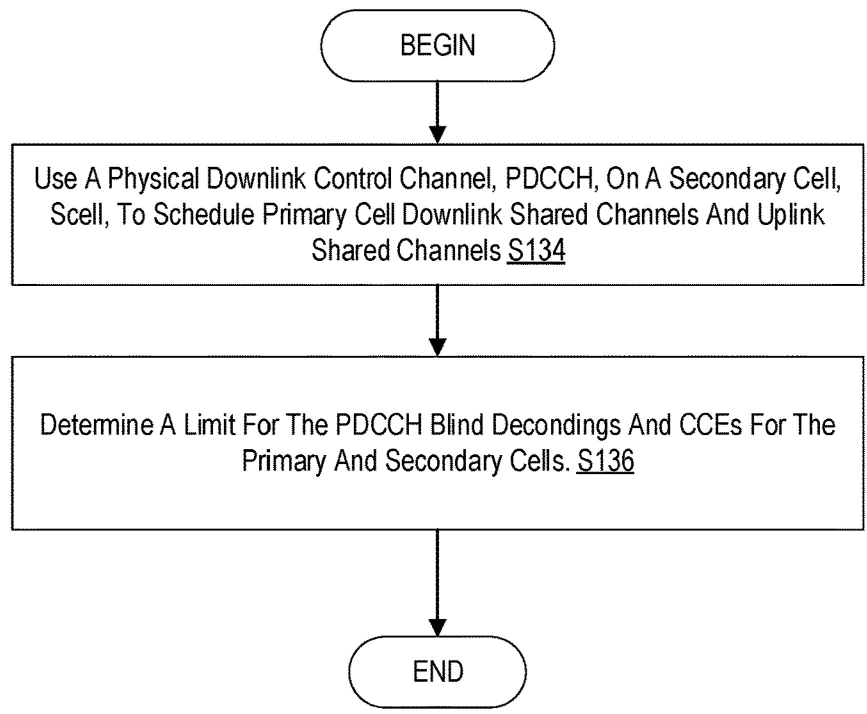
FIG. 7A-7B are flowcharts of example processes in a network node and a wireless device, respectively, for control channel handling for enhanced cross carrier scheduling.

FIG. 7A is a flowchart of an example process in a network node 16 for control channel handling for enhanced cross carrier scheduling. One or more blocks described herein may be performed by one or more elements of network node 16 such as by one or more of processing circuitry 68 (including the scheduler 32), processor 70, radio interface 62 and/or communication interface 60. Network node 16 such as via processing circuitry 68 and/or processor 70 and/or radio interface 62 and/or communication interface 60 is configured to use a physical downlink control channel, PDCCH, on a secondary cell, SCell, to schedule a physical shared channels on a primary cell, PCell (Block S134). The process includes determining a limit for the PDCCH Blind Decodings and CCEs, BDs/CCEs, for the primary and secondary cells. (Block S136).

Figure 7B:
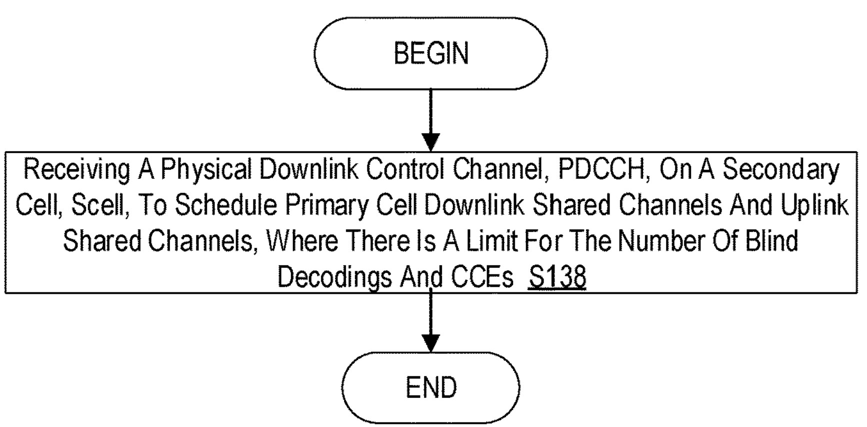

FIG. 7B is a flowchart of an example process in a wireless device for control channel handling for enhanced cross carrier scheduling. One or more blocks described herein may be performed by one or more elements of wireless device 22 such as by one or more of processing circuitry 84, processor 86 and/or radio interface 82. Wireless device 22 such as via processing circuitry 84 and/or processor 86 and/or radio interface 82 is configured to use a physical downlink control channel, PDCCH, on a secondary cell, SCell, to schedule a physical shared channels such as a physical downlink shared channel, PDSCH, or a physical uplink shared channel, PUSCH, on a primary cell, PCell (Block S138), receive a physical downlink control channel, PDCCH, wherein there is a limit for the PDCCH Blind Decodings and CCEs, BDs/CCEs, for the primary and secondary cells.

Having described the general process flow of arrangements of the disclosure and having provided examples of hardware and software arrangements for implementing the processes and functions of the disclosure, the sections below provide details and examples of arrangements for control channel handling for enhanced cross carrier scheduling.

First, the dynamic spectrum sharing (DSS) scenario and enhanced cross-carrier scheduling (CCS) framework is described. Then, the options/embodiments for control channel handling with respect to blind decoding/control channel element (BD/CCE) limit determination are disclosed.

Figure 8:
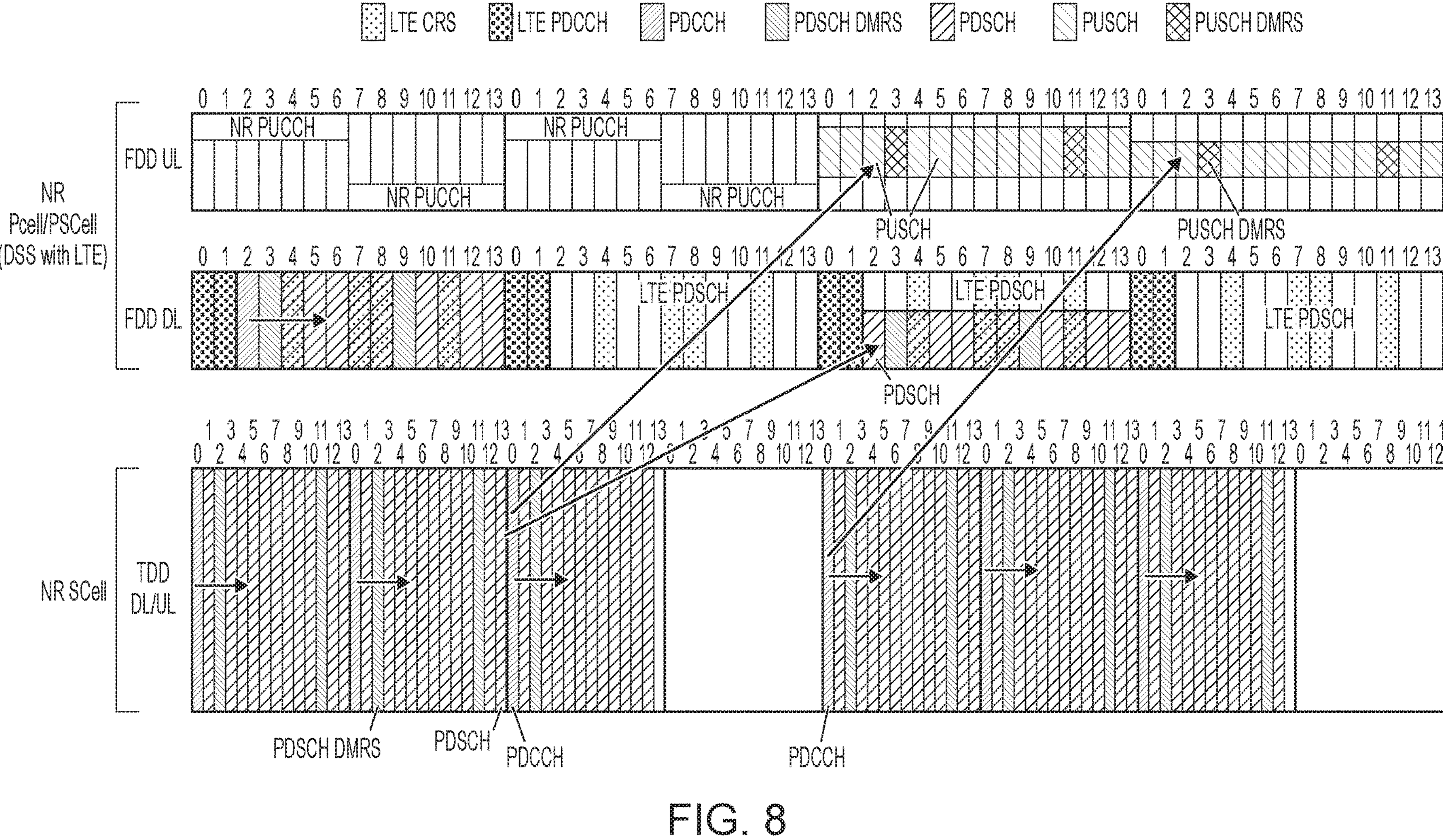
FIG. 8 is a timing diagram for a DSS scenario and enhanced CCS framework.

FIG. 8 below illustrates an example DSS scenario. In FIG. 8:

- slots for a NR PCell/PSCell (primary cell) for a DL CA capable WD 22 operated on a carrier where the same carrier is also used for serving LTE users via dynamic spectrum sharing; and
- slots for another NR SCell configured for the same WD 22.

As shown in FIG. 8, when a NR primary cell is operated on the same carrier on which legacy LTE users are served, the opportunities for transmitting PDCCH are significantly limited due to the need to avoid overlap with LTE transmissions (e.g. LTE PDCCH, LTE PDSCH, LTE CRS).

For a WD 22 supporting DL CA, providing the ability to use SCell PDCCH to schedule primary cell PDSCH/PUSCH (e.g. as shown by red arrows in the figure) helps in reducing the loading of primary cell PDCCH.

FIG. 8 applies to a CA scenario for a DL CA capable WD 22 with NR primary cell on frequency division duplex (FDD) carriers with 15 kHz subcarrier spacing (SCS), and NR SCell on time division duplex (TDD) carrier with 30 kHz SCS. This is just one possible scenario. Other scenarios (e.g. SCell being operated on FDD band) with 15 kHz SCS are also possible.

To enable support of SCell scheduling PDSCH/PUSCH on primary cell, the existing NR CCS framework can be enhanced as below:

1) It should be possible to radio resource control (RRC) configure a DL CA capable WD 22 with at least one SCell such that PDCCH on that SCell can schedule PUSCH and/or PDSCH on the primary cell. Such an SCell can be called e.g. a special SCell (sSCell).
2) When WD 22 is configured with sSCell:
   a) PDCCH on primary cell can only schedule PDSCH/PUSCH transmissions on the primary cell (no CCS allowed from primary cell);
   b) PDCCH on sSCell can schedule PDSCH/PUSCH on:
      i) primary cell of the cell group (CG) of the sSCell;
      ii) sSCell (i.e., sSCell cannot be a 'scheduled cell' for another cell);
      iii) other SCells in the same CG of sSCell for which the sSCell is configured as a scheduling cell; and
   c) the primary cell can be considered to have 'two scheduling cells', i.e., the primary cell itself and the sSCell. Other serving cells can only have one scheduling cell.

The above conditions simplify sSCell operation without reducing flexibility. For example, the main motivation of sSCell is to reduce PDCCH load on primary cell and supporting CCS from primary cell would only increase PDCCH load. So, such combination is not required when sSCell is configured.

The WD 22 typically uses the primary cell for initial access, link maintenance, and overall as an anchor cell for maintaining NW connection. The WD 22 always monitors the primary cell and the primary cell is always a scheduling cell and is always activated.

Enhanced CCS, where an SCell can also schedule primary cell, can reduce the loading on the PDCCH of the primary cell. A key feature is that the primary cell has two scheduling cells-primary cell and an SCell that can also schedule the primary cell (sSCell). Then, for such a case the BD/CCE limits need to be identified, i.e.:

- Maximum number of BDs/CCEs supported on the primary cell;
- Maximum number of BDs/CCEs supported on the secondary cell for scheduling the primary cell;
- Maximum number of BDs/CCEs supported on the secondary cell for scheduling the secondary cell;
- Maximum number of BDs/CCEs supported for scheduling the other secondary cells.

Based on identified limits, the network, such as via network node 16, can configure PDCCH candidates appropriately for the different search spaces on different serving cells. WD 22 monitors the PDCCH candidates on the primary and the sSCell according to the configuration, detects a DCI format for transmitting/receiving data on the primary cell, and transmits/receives data according to the detected DCI format.

Several example options for identifying the BD/CCEs limits are disclosed below.

Option 0: Single Reference Scheduling Cell

A single reference scheduling cell C is chosen from the two cells (C1, C2) scheduling the same cell (the primary cell C1) and the BD/CCE limits are determined for the reference scheduling cell (C). This determination can be done using the existing scheme (e.g. as if sSCell is not configured). The BD/CCE limits determined for that single reference scheduling cell are applied as an aggregate limit over the following two scheduling cases:

- scheduling cell C and scheduled cell C; and
- scheduling cell C and scheduled cell C1.

When there are multiple scheduling cells with the numerology C, the BD/CCE limits are determined as an aggregate over all scheduling cells of the same numerology C. In such cases, the BD/CCE limits determined for the SCS corresponding to the single reference scheduling cell can then applied as an aggregated limit over the following scheduling cases:

- scheduling cell C and scheduled cell C;
- scheduling cell C and scheduled cell C1; and
- scheduling cells with numerology C.

The reference scheduling cell can be selected based on reference numerology which can be the numerology of the sSCell, numerology of the primary cell, or based on the numerology of the sSCell and the primary cell (e.g., smaller or larger SCS of the SCS of scheduling and scheduled cells).

Figure 9C:
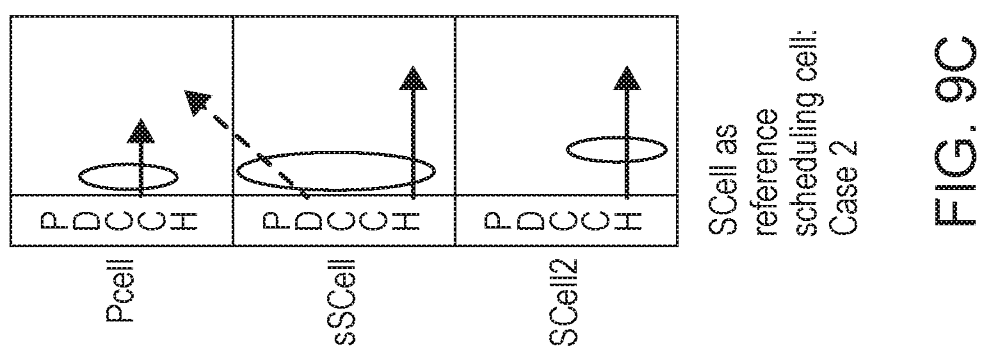
FIGS. 9A-9C are scheduling diagrams according to principles set forth herein.
Figure 9B:
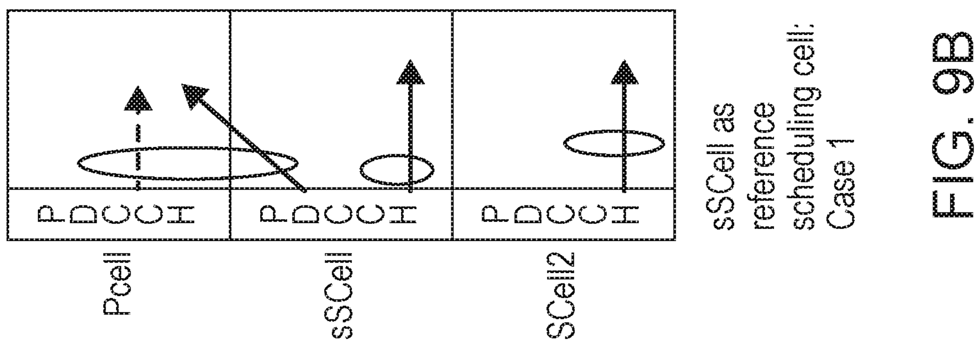
Figure 9A:
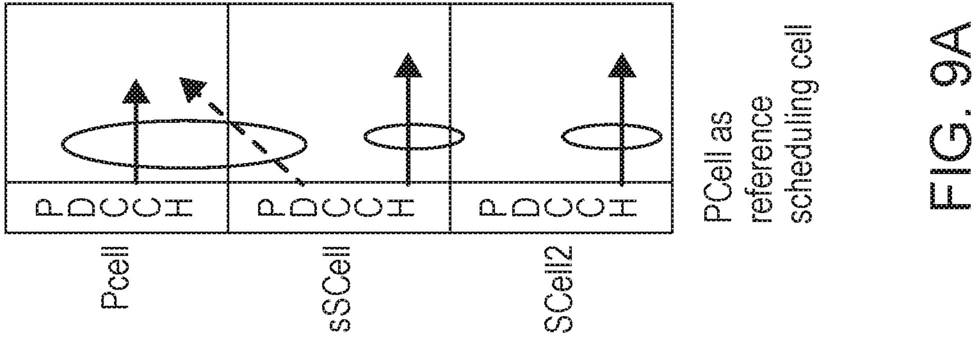

Example illustrations of the reference scheduling cells are in FIGS. 9A-9C, where arrows denote the scheduling cell, scheduled cell relationship, and where dashed line shows the scheduling cell, scheduled cell pair which is grouped with another pair of (scheduling cell, scheduled cell) for the purpose of BD/CCE limit calculation.

- In FIG. 9A, (PCell as reference scheduling cell), the primary cell is considered as the reference scheduling cell (solid line with arrow), and the primary cell scheduling primary cell and sSCell scheduling primary cell (within same group as shown by the oval) share the same BD/CCE budget which is determined using the primary cell scheduling primary cell as reference.
- In FIG. 9B, (sSCell as reference scheduling cell, Case 1), the sSCell is considered as the reference scheduling cell (solid line with arrow), and the sSCell scheduling primary cell and primary cell scheduling primary cell (within same group as shown by the oval) share the same BD/CCE budget that is determined using the sSCell scheduling primary cell as the reference.
- In FIG. 9C, (sSCell as reference scheduling cell, Case 2), the primary cell is considered as the reference scheduling cell (solid line with arrow), and the sSCell scheduling sSCell and sSCell scheduling primary cell (within same group as shown by the oval) share the same BD/CCE budget that is determined using the sSCell scheduling sSCell as reference Instead of reference scheduling cell, a reference numerology for a scheduling cell can be used for determining the BD/CCE limits. For each pair of scheduled cell and scheduling cell the corresponding single serving cell BD/CCE limit per slot of a scheduling cell can be applied also. So, e.g. for a primary cell with 15 kHz SCS, per-slot limit of 44 BDs/56 CCEs is applicable. For the SCell1 with 30 kHz SCS scheduling the primary cell, a per-slot limit of 36 BDs/56 CCEs is applicable for scheduling of the primary cell.

Example 0-1: the WD 22 is configured with a primary cell with 15 kHz numerology and one SCell with 30 kHz numerology, and the SCell is also configured as an sSCell. The BD/CCE limits and example BD/CCE allocation are shown below, where primary cell numerology is the reference numerology for the two cells scheduling primary cell (and primary cell is the reference scheduling cell C), where:

- Maximum number of BDs/CCEs per Pcell slot duration possible to be configured for Pcell→Pcell and SCell1→Pcell is given by maximum number of BDs/CCEs possible to be configured for Pcell→Pcell when sSCell is not configured
- Maximum number of BDs/CCEs per SCell1 slot duration possible to be configured for SCell1→SCell1 is given by maximum number of BDs/CCEs possible to be configured for SCell1→SCell1 when sSCell is not configured

| | Primary cell→Primary cell (slot = 1 ms) | SCell→primary cell (slot = 0.5 ms) | SCell→SCell (slot = 0.5 ms) |
|---|---|---|---|
| Limit on BDs/CCEs | 44/56 per 1 ms | | 36/56 per 0.5 ms |
| Example BDs per slot of scheduling cell | 22 | 11 | 36 |

-continued

| | Primary cell→Primary cell (slot = 1 ms) | SCell→primary cell (slot = 0.5 ms) | SCell→SCell (slot = 0.5 ms) |
|---|---|---|---|
| Example CCEs per slot of scheduling cell | 16 | 20 | 56 |

The BD/CCE limits and example BD/CCE allocation are shown below, where SCell numerology is the reference numerology for the two cells (i.e., primary cell and sSCell) scheduling primary cell (and sScell is the reference scheduling cell C) with Case 1.

In summary:

Maximum number of BDs/CCEs per Scell1 slot duration possible to be configured for Pcell→Pcell and SCell1→Pcell is given by Maximum number of BDs/CCEs possible to be configured for SCell→Pcell when sSCell is not configured; and Maximum number of BDs/CCEs per SCell1 slot duration possible to be configured for SCell1→SCell1=Maximum number of BDs/CCEs possible to be configured for SCell1→SCell1 when sSCell is not configured.

| | Primary cell→Primary cell (slot = 1 ms) | SCell→Primary cell (slot = 0.5 ms) | SCell→SCell (slot = 0.5 ms) |
|---|---|---|---|
| Limit on BDs/CCEs | 36/56 per 0.5 ms | | 36/56 per 0.5 ms |
| Example BDs per slot of scheduling cell | 22 | 11 | 36 |
| Example CCEs per slot of scheduling cell | 16 | 20 | 56 |

The BD/CCE limits and example BD/CCE allocation are shown below, where SCell numerology is the reference numerology for the two cells (i.e., primary cell and sSCell) scheduling primary cell (and sScell is the reference scheduling cell C). Scell with Case 2. In summary.

Maximum number of BDs/CCEs per Pcell slot duration possible to be configured for Pcell→Pcell is given by Maximum number of BDs/CCEs possible to be configured for Pcell→Pcell when sSCell is not configured; and Maximum number of BDs/CCEs per SCell1 slot duration possible to be configured for SCell1→Pcell and SCell1→SCell1=Maximum number of BDs/CCEs possible to be configured for SCell1→SCell1 when sSCell is not configured.

| | Primary cell→Primary cell (slot = 1 ms) | SCell1→Primary cell (slot = 0.5 ms) | SCell1→SCell1 (slot = 0.5 ms) |
|---|---|---|---|
| Limit on BDs/CCEs | 44/56 per 1 ms | 36/56 per 0.5 ms | |
| Example BDs per slot of scheduling cell | 44 | 18 | 18 |
| Example CCEs per slot of scheduling cell | 56 | 28 | 28 |

Example 0-3: the WD 22 is configured with a primary cell with 15 kHz numerology and four SCells with 30 kHz numerology, and the WD 22 indicates a pdcch-BlindDetectionCA capability of 4. WD 22 is additionally configured with SCell1 as sSCell.

The BD/CCE limits and example BD/CCE allocation are shown below, where SCell1 numerology is the reference numerology for the two cells scheduling primary cell. Since there are other cells with same numerology, the BD/CCE limits are an aggregate limit applied to scheduling cells of a given numerology.

Here:

The Maximum number of BDs/CCEs possible to be configured for Pcell→Pcell per Pcell slot duration=Maximum number of BDs/CCEs possible to be configured for Pcell→Pcell when sSCell is not configured;

The Maximum number of BDs/CCEs possible to be configured for SCell1→Pcell+SCell1→SCell1 per SCell1 slot duration=Maximum number of BDs/CCEs possible to be configured for SCell1→SCell1 when sSCell is not configured;

Maximum number of BDs/CCEs possible to be configured for SCell2→SCell2 per SCell2 slot duration=Maximum number of BDs/CCEs possible to be configured for SCell2→SCell2 when sSCell is not configured, and so on for other SCells.

| | Primary cell | SCell1→Primary cell | SCell1→SCell1 | SCell2→SCell2 | SCell3→SCell3 | SCell4→SCell4 |
|---|---|---|---|---|---|---|
| Limit on BDs/ CCEs | $\lfloor 4 \times 44 \times 1/5 \rfloor = 35$ BDs per 1 ms $\lfloor 4 \times 56 \times 1/5 \rfloor = 44$ CCEs per 1ms | | $\lfloor 4 \times 36 \times 4/5 \rfloor = 115$ BDs per 0.5 ms $\lfloor 4 \times 56 \times 4/5 \rfloor = 179$ CCEs per 0.5 ms | | | |
| Example BDs per slot of schedul-ing cell | 35 | 23 | 23 | 23 | 23 | 23 |
| Example CCEs per slot of schedul-ing cell | 44 | 35 | 35 | 35 | 35 | 36 |

With this example, extra BDs/CCEs may be taken away from the SCells scheduling themselves, i.e., the 115 BDs/179 CCEs may be partitioned to allow the SCell1 scheduling primary cell in addition to the four SCells scheduling themselves.

Example 0-3 (cont'd): The BD/CCE limits and example BD/CCE allocation are shown below, where Primary cell numerology is the reference numerology for the two cells scheduling primary cell. If there are other cells with same numerology, the BD/CCE limits are an aggregate limit applied to scheduling cells of a given numerology. Here:

- The Maximum number of BDs/CCEs per Pcell slot duration possible to be configured for Pcell→Pcell and SCell1→Pcell is given by maximum number of BDs/CCEs possible to be configured for Pcell→Pcell when sSCell is not configured;
- The Maximum number of BDs/CCEs per SCell1 slot duration possible to be configured for SCell1→SCell1 is given by maximum number of BDs/CCEs possible to be configured for SCell1→SCell1 when sSCell is not configured; and
- The Maximum number of BDs/CCEs possible to be configured for SCell2→SCell2 per SCell2 slot duration is given by maximum number of BDs/CCEs possible to be configured for SCell2→SCell2 when sSCell is not configured, and so on.

| | Primary cell | SCell1→Primary cell | SCell1→SCell1 | SCell2→SCell2 | SCell3→SCell3 | SCell4→SCell4 |
|---|---|---|---|---|---|---|
| Limit on BDs/ CCEs | $\lfloor 4 \times 44 \times 1/5 \rfloor = 35$ BDs per 1 ms $\lfloor 4 \times 56 \times 1/5 \rfloor = 44$ CCEs per 1 ms | | $\lfloor 4 \times 36 \times 4/5 \rfloor = 115$ BDs per 0.5 ms $\lfloor 4 \times 56 \times 4/5 \rfloor = 179$ CCEs per 0.5 ms | | | |
| Example BDs per slot of schedul-ing cell | X1 = 17 per 1 ms | X2 = 9 per 0.5 ms | 28 | 28 | 28 | 29 |
| Example CCEs per slot of schedul-ing cell | Y1 = 16 per 1 ms | Y2 = 12 per 0.5 ms | 44 | 44 | 44 | 45 |

An example of the BDs per slot of scheduling cell is illustrated below for the two cells scheduling the primary cell.

| slot on primary cell | n | | n + 1 | | n + 2 | |
|---|---|---|---|---|---|---|
| primary cell | X1 | | X1 | | X1 | |
| Scell1->primary cell | X2 | X2 | X2 | X2 | X2 | X2 |

When the reference numerology (e.g. 15 kHz) is smaller than the numerology of the sSCell (e.g. 30 kHz), the limits may be applied to a window with a reference slot duration (e.g., 1 ms) whose boundary is aligned with a slot boundary of the primary cell, and/or the sSCell.

In summary, with this option, the determination of BDs/CCEs limits is the same as the existing one, while the allocated BDs/CCEs for the SCell to schedule PDSCH/PUSCH on the primary cell come from:

- the BDs/CCEs budgets associated with the primary cell, if the reference numerology is the same as the numerology of the primary cell; or
- the BDs/CCEs budgets associated with the sSCell, if the reference numerology is the same as the numerology of the sSCell.

Option 1a: An Additional Virtual Cell

The sSCell scheduling a primary cell is considered as an additional virtual cell (e.g. separated from the sSCell scheduling sSCell) for the purpose of determining the BD/CCE limits, and possibly for comparison against the BD/CCE parameter. The additional virtual cell can be considered as virtual cell with self-scheduling of a given numerology or a virtual scheduling cell with a scheduling cell/scheduled cell pair for the purpose of determining the BD/CCE limits. The determined limits are then applied for the sSCell scheduling primary cell.

The virtual cell can have the numerology of sSCell, numerology of the primary cell, or a numerology based on the numerologies of the sSCell and primary cell.

Figure 10:
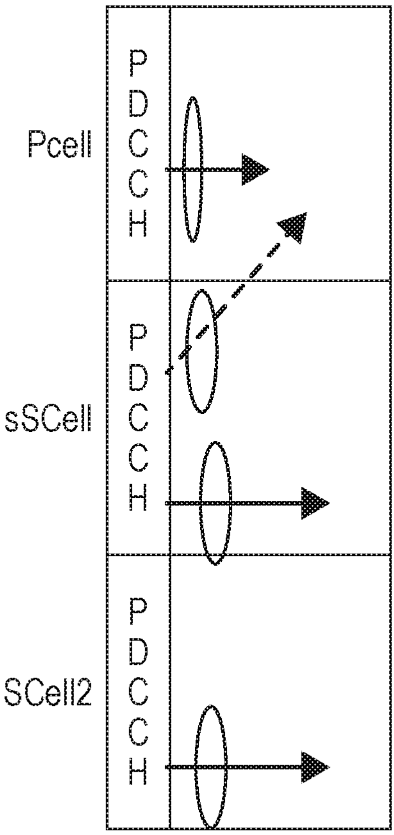
FIG. 10 is another scheduling diagram according to principles set forth herein.

An illustration of an example reference scheduling cell is shown in FIG. 10, where arrows denote the scheduling cell, scheduled cell relationship, and where dashed line shows the sSCell scheduling primary cell. The ovals show scheduling cells, including the sSCell scheduling primary cell, which is shown an extra/separate virtual cell.

The BD/CCE limits determined for the additional virtual cell are the BD/CCE limits applicable to the PDCCH monitoring on the sSCell scheduling DCI formats for primary cell. An example partitioning is shown below. If a WD 22 is configured with $$N_{cells}^{DL,\mu}$$

downlink cells with DL BWPs having SCS configuration, μ and WD 22 is configured with an sSCell, where $$\sum_{\mu=0}^{3} N_{cells}^{DL,\mu} + 1 > N_{cells}^{cap},$$

a DL BWP of an activated cell is the active DL BWP of the activated cell, and a DL BWP of a deactivated cell is the DL BWP with index provided by firstActiveDownlinkBWP-Id for the deactivated cell, the WD 22 is not required to monitor more than $$M_{PDCCH}^{total,slot,\mu} = \left\lfloor N_{cells}^{cap} \cdot M_{PDCCH}^{max,slot,\mu} \cdot \left(\beta_\mu \cdot N_{cells}^{DL,\mu}\right) / 1 + \sum_{j=0}^{3} N_{cells}^{DL,j} \right\rfloor$$

PDCCH candidates or more than $$C_{PDCCH}^{total,slot,\mu} = \left\lfloor N_{cells}^{cap} \cdot C_{PDCCH}^{max,slot,\mu} \cdot \left(\beta_\mu \cdot N_{cells}^{DL,\mu}\right) / 1 + \sum_{j=0}^{3} N_{cells}^{DL,j} \right\rfloor$$

non-overlapped CCEs per slot on the active DL BWP(s) of scheduling cell(s) from the $$N_{cells}^{DL,\mu} + \beta_\mu$$

downlink cells, where $\beta_\mu$ is 1 for μ (i.e., SCS) corresponding to the virtual scheduling cell, and is 0 otherwise.

Example 1-1: WD 22 is configured with a primary cell with 15 kHz numerology and four SCells with 30 kHz numerology (each is self-scheduled), and the WD 22 indicates a pdcch-BlindDetectionCA capability of $$N_{cells}^{cap} = 4.$$

WD 22 is also configured with an sSCell, i.e. SCell 1 can be a scheduling cell for the primary cell. Consider virtual cell has numerology of 30 kHz, the BD/CCEs limit partitioning is as follows.

Then for the 15 kHz(μ=0), the $$M_{PDCCH}^{total,slot,\mu} = \lfloor 4 \times 44 \times 1/6 \rfloor = 29,$$

$$C_{PDCCH}^{total,slot,\mu} = \lfloor 4 \times 56 \times 1/6 \rfloor = 37$$

and for the 30 kHz (μ=1), the $$M_{PDCCH}^{total,slot,\mu} = \lfloor 4 \times 36 \times 5/6 \rfloor = 120,$$

$$C_{PDCCH}^{total,slot,\mu} = \lfloor 4 \times 56 \times 5/6 \rfloor = 186.$$

Thus:

- For the 15 kHz primary cell that is self-scheduling, the WD 22 can be configured with up to 29 BDs and maximum of 37 non-overlapped CCEs per slot;
- For the 30 kHz scheduling cells:
  - the WD 22 can be configured with an aggregate (across all four SCells) of maximum 120 BDs and maximum of 186 non-overlapped CCEs per slot;
  - A per pair of (scheduled cell, scheduling cell) limit of 36 BDs and 56 CCEs per slot of a scheduling cell.

The BD/CCE limits and example BD/CCE allocation are shown below.

| | Primary cell | SCell1→Primary cell | SCell1→SCell1 | SCell2 | SCell3 | SCell4 |
|---|---|---|---|---|---|---|
| Limit on BDs/CCEs | 29/37 | | 120/86 | | | |
| BDS per slot of scheduling cell | 29 | 24 | 24 | 24 | 24 | 24 |
| CCEs per slot of scheduling cell | 37 | 37 | 37 | 37 | 37 | 38 |

Example 1-1 (Cont'd): Consider the virtual cell with numerology of 15 kHz (i.e. of primary cell), the BD/CCEs limit is as follows. Then, for the 15 kHz(μ=0), the $$M_{PDCCH}^{total,slot,\mu} = \lfloor 4\times 44\times 2/6 \rfloor = 58,\ C_{PDCCH}^{total,slot,\mu} = \lfloor 4\times 56\times 2/6 \rfloor = 74$$

and for the 30 kHz (μ=1), the $$M_{PDCCH}^{total,slot,\mu} = \lfloor 4\times 36\times 4/6 \rfloor = 96,\ C_{PDCCH}^{total,slot,\mu} = \lfloor 4\times 56\times 4/6 \rfloor = 149$$

Thus,

For the 15 kHz primary cell (that is self-scheduling) and the sSCell scheduling primary cell, the WD 22 can be configured with up to 58 BDs and maximum of 74 non-overlapped CCEs per 1 ms slot;

For the 30 kHz scheduling cells:

- the WD 22 can be configured with an aggregate (across all four SCells) of maximum 96 BDs and maximum of 149 non-overlapped CCEs per slot;
- A per pair of (scheduled cell, scheduling cell) limit of 36 BDs and 56 CCEs per slot of a scheduling carrier.

The BD/CCE limits and example BD/CCE allocation is shown below.

| | Primary cell | SCell1→Primary cell | SCell1→SCell1 | SCell2 | SCell3 | SCell4 |
|---|---|---|---|---|---|---|
| Limit on BDs/CCEs | 58/74 per 1 ms slot | | 96/149 per 0.5 ms | | | |
| BDs per slot of scheduling cell | 16 | 21 | 24 | 24 | 24 | 24 |
| CCEs per slot of scheduling cell | 24 | 24 | 37 | 37 | 37 | 37 |

Option 1b: Fractional Virtual Cells (or Virtual Cells with Reduced BD/CCE Budgets)

The primary cell scheduling primary cell and sSCell scheduling primary cell are each counted as virtual cells with smaller BD/CCE limits than a regular scheduling cell or a fraction virtual cell. For example:

- The primary cell scheduling primary cell may be considered as carrier with weight $1-a^{\mu}=0.5$, and $1-b^{\mu}=0.5$, for primary cell numerology μ;
- The sSCell cell scheduling primary cell may be considered as carrier with weight $1-a^{\mu}=0.5$, and $1-b^{\mu}=0.5$, for sSCell numerology μ; and
- The weights may be configured by higher layers, or indicated via WD 22 capability signaling.

An example partitioning is shown below. If a WD 22 is configured with $$N_{cells}^{DL,\mu}$$

downlink cells with DL bandwidth parts (BWPs) having SCS configuration μ and WD 22 is configured with an sSCell, where $$\sum_{\mu=0}^{3} N_{cells}^{DL,\mu} > N_{cells}^{cap},$$

a DL BWP of an activated cell is the active DL BWP of the activated cell, and a DL BWP of a deactivated cell is the DL BWP with index provided by firstActiveDownlinkBWP-Id for the deactivated cell, the WD 22 is not required to monitor more than $$M_{PDCCH}^{total,slot,\mu} = \left\lfloor N_{cells}^{cap} \cdot M_{PDCCH}^{max,slot,\mu} \cdot \left(-a^{\mu} \cdot N_{cells}^{DL,\mu}\right) \Big/ \sum_{j=0}^{3} N_{cells}^{DL,j} \right\rfloor$$

PDCCH candidates or more than $$C_{PDCCH}^{total,slot,\mu} = \left\lfloor N_{cells}^{cap} \cdot C_{PDCCH}^{max,slot,\mu} \cdot \left(-b^{\mu} \cdot N_{cells}^{DL,\mu}\right) \Big/ \sum_{j=0}^{3} N_{cells}^{DL,j} \right\rfloor$$

non-overlapped CCEs per slot on the active DL BWP(s) of scheduling cell(s) from the $$N_{cells}^{DL,\mu} + \beta_{\mu}$$

downlink cells, where $a^{\mu}=0.5$, $b^{\mu}=0.5$ for μ (i.e., SCS) corresponding to the primary cell, where $a^{\mu}=-0.5$, $b^{\mu}=-0.5$ for y (i.e., SCS) corresponding to the sSCell, and where $a^{\mu}=0$, $b^{\mu}=0$ for other values of μ (i.e., SCS).

When the sSCell is configured:

- there can be an additional per-slot maximum number of BDs/CCEs for primary-cell scheduling primary cell (e.g. 22 BDs/28 CCEs for 15 kHz Primary cell) which may be smaller than that of the regular single serving cell case (44 BDs/56 CCEs for 15 kHz Primary cell); and
- there can be an additional per-slot maximum number of BDs/CCEs for sSCell scheduling primary cell (e.g. 18 BDs/28 CCEs for a 30 kHz sSCell) which may be smaller than that of the regular single serving cell case (36 BDs/56 CCEs for 30 kHz sSCell).

Option 2: Per-Scheduled Cell Limitation

The BD/CCEs limitations are determined based on the scheduled cell slot duration for the sSCell scheduling primary cell. BD/CCE scaling is applied, i.e., if max X BDs/Y CCEs are allowed on a slot on the primary cell, then if sSCell is configured, the WD 22 can be configured with a partitioning of BDs/CCEs for scheduling the primary cell such that a first number of BDs/CCEs are configured on the primary cell(X1/Y1) per slot of primary cell, a second number of BDs/CCEs are configured on SCell (X2/Y2) per slot of SCell, such that X1 and X2 satisfy a certain condition, and Y1 and Y2 satisfy a certain condition. For example, the BDs/CCEs limits may be as illustrated in FIG. 10.

For example, X1 can be a1*X (or no larger than a1*X), and X2 can be a2*X (or no larger than a2*X), with some approximation to obtain integer values (e.g. floor, ceil, etc.). The factor a1 and a2 can be pre-defined factors or can be based on WD 22 capability signaling or can be configured via RRC signaling. In one example, a1=0.5, a2=0.25. In another example a1=a2=1. In an example, a1+a2 can be larger than or equal to 1.

For example, Y1 can be b1*Y (or no larger than b1*Y), and Y2 can be b2*Y (or no larger than b2*Y)s, with some approximation to obtain integer values (e.g. floor, ceil, etc.). The factor b1 and b2 can be pre-defined factors or can be based on WD 22 capability signaling. In one example, b1=0.5, b2=0.25. In another example b1=b2=1. Alternatively, a per-slot upper limit on BD/CCEs for scheduling primary cell can be formed. For example, X1+2*X2<35, and Y1+2*Y2<44.

For such a case, when WD 22 is configured with sSCell (i.e., an SCell is also used for scheduling PDSCH/PUSCH on primary cell), the spare X-X1 BDs are used for sSCell to Pcell scheduling without exceeding WD 22*s* total BD limit, and without any borrowing of BDs from any of scheduling/scheduled cells; and On the other hand, when WD 22 is configured with N DL serving cells, the BDs are borrowed from one of the scheduling/scheduled cells are discussed in above Options 0, 1, 2.

More generally:

based on WD 22 capability signaling, it can be determined that the WD 22 supports max X BDs for a DL CA scenario with a primary cell and Y SCells; and Then when Y1 SCells are configured for the WD 22 for DL CA, it is determined that max X1 BDs are needed for primary cell scheduling primary cell and SCell scheduling SCell cases;

When one of the Y1 SCells is configured as a sSCell for sSCell scheduling primary cell;

If Y1<Y some or all X−X1 BDs can be used for sSCell scheduling primary cell and the max BDs for primary cell scheduling primary cell and SCell scheduling SCell cases are not reduced.

If Y1=Y the max BDs for primary cell scheduling primary cell and/or SCell scheduling SCell cases are reduced and some or all of them are allocated to sSCell scheduling primary cell.

| | Primary cell | SCell1→Primary cell | SCell1→SCell1 | SCell2 | SCell3 | SCell4 |
|---|---|---|---|---|---|---|
| Limit on BDs/CCEs | 35/44 per 1 ms | | 115/179 per 0.5ms slot | | | |
| Example A: BDs per slot of scheduling cell | X1 = 17 | X2 = 8 | 28 | 28 | 28 | 29 |
| Example A: CCEs per slot of scheduling cell | Y1 = 22 | Y2 = 8 | 44 | 44 | 44 | 45 |
| Example B: BDs per slot of scheduling cell | X1 = 17 | 2*X2 = 16 across two slots* | 28 | 28 | 28 | 29 |
| Example B: CCEs per slot of scheduling cell | Y1 = 22 | 2*Y2 = 16 across 2 slots* | 44 | 44 | 44 | 45 |

Option 3: Borrow "Extra BD" Capacity for sSCell Scheduling Primary Cell

The BD/CCE limits are based on DL CA capability reported by the WD 22 and the number of DL SCells configured for the WD 22.

For example:

where WD 22 indicates that it can support CA with N DL serving cells, this implies it can support a max of X BDs (e.g. N=4 and all cells with 15 kHZ SCS implies WD 22 supports a max BDs of 44*4=176 BDs);

If the WD 22 is configured with N1<N DL serving cells, only a max of X1 BDs need to be configured for that WD 22 for that case. This leaves a 'spare' capacity of X-X1 BDs (e.g. N1=2 indicates that 88 BDs are used and a 'spare' BD capacity of 176−88=88 BDs is available);

Example 3-1: the WD 22 is configured with a primary cell with 15 kHz numerology and one SCell with 30 kHz numerology, and the SCell is also configured as an sSCell. Based on WD 22 capability signaling, NW may infer the WD 22 is capable of supporting CA with three carriers. Then the NW can assign the extra capacity for the sSCell scheduling primary cell. The BD/CCE limits and example BD/CCE allocation are shown below.

| | Primary cell→primary cell | SCell→primary cell | SCell→SCell |
|---|---|---|---|
| Limit on BDs/CCEs | 44/56 per 1 ms | 36/56 per 0.5 ms | 36/56 per 0.5 ms |
| Example BDs per slot of scheduling cell | 44 | 36 | 36 |
| Example CCEs per slot of scheduling cell | 56 | 56 | 56 |

Solutions provided herein allow an SCell (referred to as a special SCell or sSCell) to schedule PDSCH/PUSCH on a primary cell. Some specific aspects disclosed are

- Determining the limits on PDCCH BD/CCE for one or more of the following when sSCell is configured;
- Solutions provided herein allow an SCell (referred to as a special SCell or sSCell) to schedule PDSCH/PUSCH on a primary cell. Some specific aspects disclosed are
- Determining the limits on PDCCH BD/CCE for one or more of the following when sSCell is configured:
- Cases including 1) Primary cell scheduling primary cell, 2) SCell scheduling the primary cell, 3) SCell scheduling the SCell and 4) Other scheduling/scheduled cells;
- Embodiments include using options 0-3 as disclosed above and acquiring a search space configuration according to the identified limits for primary cell scheduling primary cell and sSCell scheduling primary cell:
  - using a single reference scheduling cell to identify the limits on BD/CCEs for the sSCell scheduling primary cell and primary cell scheduling primary cell.
  - consider the sSCell scheduling primary cell as an extra virtual cell for the purpose of identifying limits on BD/CCEs for the sSCell scheduling primary cell and primary cell scheduling primary cell;
  - consider sSCell scheduling primary cell and primary cell scheduling primary cell as fractional virtual cells for the purpose of identifying limits on respective BD/CCEs for the sSCell scheduling primary cell and primary cell scheduling primary cell;
  - apply a per-scheduled cell limitation to identify the limit on BD/CCEs across the sSCell scheduling primary cell and primary cell scheduling primary cell; and
  - Borrowing extra BD capacity for sSCell scheduling primary cell when there is unused or underutilization of the BD/CCEs corresponding to WD's carrier aggregation capability.

Thus, in some embodiments, a network node 16 includes processing circuitry 68 configured to: use a secondary cell, SCell, physical downlink control channel, PDCCH, to schedule primary cell downlink shared channels and uplink shared channels; and configure the WD 22 with at least one SCell to receive the PDCCH, the PDCCH scheduling the primary cell downlink shared channels and uplink shared channels.

According to this aspect, in some embodiments, when the WD 22 is configured with the at least one SCell, the processing circuitry 68 is further configured to restrict the PDCCH of the primary cell to only schedule the primary cell downlink shared channels and uplink shared channels. In some embodiments, when the WD 22 is configured with the at least one SCell, the processing circuitry 68 is further configured to schedule downlink shared channels and uplink shared channels on a primary cell of a cell group of the at least one SCell. In some embodiments, when the WD 22 is configured with the at least one SCell, the processing circuitry is further configured to schedule downlink shared channels and uplink shared channels on the at least one SCell. In some embodiments, when the WD 22 is configured with the at least one SCell, the processing circuitry is further configured to schedule downlink shared channels and uplink shared channels on SCells other than the at least one SCell in a same cell group of the at least one SCell.

According to another aspect, a method implemented in a network node includes using a secondary cell, SCell, physical downlink control channel, PDCCH, to schedule primary cell downlink shared channels and uplink shared channels; and configuring a WD 22 with at least one SCell to receive the PDCCH, the PDCCH scheduling the primary cell downlink shared channels and uplink shared channels.

According to this aspect, in some embodiments, when the WD 22 is configured with the at least one SCell, the method further includes restricting, via the processing circuitry 68, the PDCCH of the primary cell to only schedule the primary cell downlink shared channels and uplink shared channels. In some embodiments, when the WD 22 is configured with the at least one SCell, the method further includes scheduling, via the processing circuitry 68, downlink shared channels and uplink shared channels on a primary cell of a cell group of the at least one SCell. In some embodiments, when the WD 22 is configured with the at least one SCell, the method further includes scheduling downlink shared channels and uplink shared channels on the at least one SCell. In some embodiments, when the WD 22 is configured with the at least one SCell, the method further includes scheduling downlink shared channels and uplink shared channels on SCells other than the at least one SCell in a same cell group of the at least one SCell.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| ACK | Acknowledgment |
| ACK/NACK | Acknowledgment/Not-acknowledgment |
| BWP | Bandwidth Part |
| CBG | Code Block Group |
| DAI | Downlink Assignment Indicator |
| DCI | Downlink Control Information |
| HARQ | Hybrid Automatic Repeat Request |
| MIMO | Multiple Input Multiple Output |
| NACK | Not-acknowledgment |
| PDCCH | Physical Downlink Control Channel |
| PDSCH | Physical Downlink Shared Channel |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

EMBODIMENTS

Embodiment A1. A network node configured to communicate with a wireless device (WD), the network node configured to, and/or comprising a radio interface and/or comprising processing circuitry configured to:

use a secondary cell, SCell, physical downlink control channel, PDCCH, to schedule primary cell downlink shared channels and uplink shared channels; and configure the WD with at least one SCell to receive the PDCCH, the PDCCH scheduling the primary cell downlink shared channels and uplink shared channels.

Embodiment A2. The network node of Embodiment A1, wherein, when the WD is configured with the at least one SCell, the processing circuitry is further configured to restrict the PDCCH of the primary cell to only schedule the primary cell downlink shared channels and uplink shared channels.

Embodiment A3. The network node of Embodiment A1, wherein, when the WD is configured with the at least one SCell, the processing circuitry is further configured to schedule downlink shared channels and uplink shared channels on a primary cell of a cell group of the at least one SCell.

Embodiment A4. The network node of Embodiment A1, wherein, when the WD is configured with the at least one SCell, the processing circuitry is further configured to schedule downlink shared channels and uplink shared channels on the at least one SCell.

Embodiment A5. The network node of Embodiment A1, wherein, when the WD is configured with the at least one SCell, the processing circuitry is further configured to schedule downlink shared channels and uplink shared channels on SCells other than the at least one SCell in a same cell group of the at least one SCell.

Embodiment B1. A method implemented in a network node, the method comprising:

using a secondary cell, SCell, physical downlink control channel, PDCCH, to schedule primary cell downlink shared channels and uplink shared channels; and configuring a WD with at least one SCell to receive the PDCCH, the PDCCH scheduling the primary cell downlink shared channels and uplink shared channels.

Embodiment B2. The method of Embodiment B1, wherein, when the WD is configured with the at least one SCell, the method further includes restricting the PDCCH of the primary cell to only schedule the primary cell downlink shared channels and uplink shared channels.

Embodiment B3. The method of Embodiment B1, wherein, when the WD is configured with the at least one SCell, the method further includes scheduling downlink shared channels and uplink shared channels on a primary cell of a cell group of the at least one SCell.

Embodiment B4. The method of Embodiment B1, wherein, when the WD is configured with the at least one SCell, the method further includes scheduling downlink shared channels and uplink shared channels on the at least one SCell.

Embodiment B5. The method of Embodiment B1, wherein, when the WD is configured with the at least one SCell, the method further includes scheduling downlink shared channels and uplink shared channels on SCells other than the at least one SCell in a same cell group of the at least one SCell.

The invention claimed is:

1. A network node configured to communicate with a wireless device (WD), the WD configured with a primary cell and at least one secondary cell, the network node comprising a radio interface and a processing circuitry configured to:

use a physical downlink control channel, PDCCH, on a secondary cell, SCell, to schedule a physical shared channel on a primary cell, PCell; and determine a limit for the PDCCH Blind Decodings, BDs, and control channel elements, CCEs, BDs/CCEs, for the primary and secondary cells, the primary cell and the secondary cell sharing a common BDs/CCEs budget which is limited by the BDs/CCEs limit, the BDs/CCEs limit being a BDs/CCEs limit for the primary cell when the secondary cell is not configured.

2. The network node of claim 1, wherein the PDCCH, on a secondary cell, SCell, is further used to schedule physical shared data on the secondary cell.

3. The network node of claim 1, wherein the limit for the PDCCH Blind Decodings and CCEs, BDs/CCEs, for the primary and secondary cells is determined based on a reference numerology.

4. The network node of claim 1, wherein cells operating on a reference numerology share a common BDs/CCEs budget which is limited by the BDs/CCEs limit.

5. The network node of claim 1, wherein the secondary cell is special secondary cell, sSCell.

6. A method implemented in a network node configured to communicate with a wireless device (WD), the WD configured with a primary cell and at least one secondary cell, the method comprising:

using a physical downlink control channel, PDCCH, on a secondary cell, SCell, to schedule a physical shared channel on a primary cell, PCell; and determining a limit for the PDCCH Blind Decodings, BDs, and control channel elements, CCEs, BDs/CCEs, for the primary and secondary cells, the primary cell and the secondary cell sharing a common BDs/CCEs budget which is limited by the BDs/CCEs limit, the BDs/CCEs limit being a BDs/CCEs limit for the primary cell when the secondary cell is not configured.

7. The method of claim 6, wherein the limit for the PDCCH Blind Decodings and CCEs, BDs/CCEs, for the primary and secondary cells is determined based on a reference numerology.

8. The method of claim 6, wherein cells operating on a reference numerology share a common BDs/CCEs budget which is limited by the BDs/CCEs limit.

9. The method of claim 6, wherein the secondary cell is special secondary cell, sSCell.

10. A wireless device configured with a primary cell and at least one secondary cell, the wireless device configured to communicate with a network node and comprising a radio interface and a processing circuitry configured to:

receive a physical downlink control channel, PDCCH, on a secondary cell, SCell, to schedule physical shared channel on a primary cell, PCell; and there being a limit for the PDCCH Blind Decodings, BDs, and control channel elements, CCEs, BDs/CCEs, for the primary and secondary cells, the primary cell and the secondary cell sharing a common BDs/CCEs budget which is limited by the BDs/CCEs limit, the BDs/CCEs limit being a BDs/CCEs limit for the primary cell when the secondary cell is not configured.

11. The wireless device of claim 10, wherein the PDCCH, on a secondary cell, SCell, is further used to schedule physical shared data on the secondary cell.

12. The wireless device of claim 10, wherein the limit for the PDCCH Blind Decodings and CCEs, BDs/CCEs, for the primary and secondary cells is determined based on a reference numerology.

13. The wireless device of claim 10, wherein cells operating on a reference numerology share a common BDs/CCEs budget which is limited by the BDs/CCEs limit.

14. The network node of claim 10, wherein the secondary cell is special secondary cell, sSCell.

15. A method for a wireless device configured with a primary cell and at least one secondary cell, the wireless device configured to communicate with a network node, the method comprising:

receiving a physical downlink control channel, PDCCH, on a secondary cell, SCell, to schedule physical shared channel on a primary cell, PCell; and there being a limit for the PDCCH Blind Decodings, BDs, and control channel elements, CCEs, BDs/CCEs, for the primary and secondary cells, the primary cell and the secondary cell sharing a common BDs/CCEs budget which is limited by the BDs/CCEs limit, the BDs/CCEs limit being a BDs/CCEs limit for the primary cell when the secondary cell is not configured.

16. The method of claim 15, wherein the PDCCH, on a secondary cell, SCell, is further used to schedule physical shared data on the secondary cell.

17. The wireless device of claim 15, wherein the limit for the PDCCH Blind Decodings and CCEs, BDs/CCEs, for the primary and secondary cells is determined based on a reference numerology.

18. The wireless device of claim 15, wherein cells operating on a reference numerology share a common BDs/CCEs budget which is limited by the BDs/CCEs limit.

19. The wireless device of claim 15, wherein the secondary cell is special secondary cell, sSCell.

* * * * *